US010222993B2

(12) United States Patent
Malloy et al.

(10) Patent No.: US 10,222,993 B2
(45) Date of Patent: *Mar. 5, 2019

(54) STORAGE DEVICE ACCESS USING UNPRIVILEGED SOFTWARE CODE

(71) Applicant: MICROSOFT TECHNOLOGY LICENSING, LLC, Redmond, WA (US)

(72) Inventors: Dmitry Malloy, Maple Valley, WA (US); Dexter Paul Bradshaw, Duvall, WA (US); Suyash Sinha, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,527

(22) Filed: Jul. 6, 2016

(65) Prior Publication Data
US 2016/0313918 A1    Oct. 27, 2016

Related U.S. Application Data

(63) Continuation of application No. 13/531,510, filed on Jun. 23, 2012, now Pat. No. 9,405,682.

(51) Int. Cl.
*G06F 3/06* (2006.01)
*G06F 12/14* (2006.01)
(Continued)

(52) U.S. Cl.
CPC ............ *G06F 3/061* (2013.01); *G06F 3/0655* (2013.01); *G06F 3/0688* (2013.01);
(Continued)

(58) Field of Classification Search
CPC ............... G06F 12/1491; G06F 13/102; G06F 12/0623; G06F 12/1458; G06F 12/109;
(Continued)

(56) References Cited

U.S. PATENT DOCUMENTS 6,715,005 B1    3/2004   Rodriguez et al.
7,024,672 B2    4/2006   Callender et al.
(Continued)

OTHER PUBLICATIONS

Margoutis et al., "Making the Most out of Direct-Access Network Attached Storage", In Proceedings of the 2nd USENIX Conference on File and Storage Technologies, Mar. 31, 2003, pp. 189-202.
(Continued)

*Primary Examiner* — Glenn Gossage

(57) ABSTRACT

A computing device and method for establishing more direct access to a storage device from unprivileged code in an unprivileged storage architecture component. Using a storage infrastructure driver to discover and enumerate storage architecture component(s), a user-mode application requests at least one portion of the storage device to store application-related data corresponding to executing input/output activity. The storage infrastructure driver maps the at least one portion of the storage device to substantially match an address space associated with the application-related data and configures at least one path for the user-mode application to perform block-level input/output between the storage device and the unprivileged storage architecture component. A virtual function may be generated corresponding to at least one path between a computing device and the unprivileged storage architecture component to execute input/output activity using the address space. A completion notification mechanism may also be provided.

20 Claims, 6 Drawing Sheets

(51) Int. Cl.
  *G06F 12/06* (2006.01)
  *G06F 12/109* (2016.01)
  *G06F 13/10* (2006.01)
  *G06F 12/02* (2006.01)

(52) U.S. Cl.
  CPC ........ *G06F 12/0623* (2013.01); *G06F 12/109* (2013.01); *G06F 12/1458* (2013.01); *G06F 12/1491* (2013.01); *G06F 12/0238* (2013.01); *G06F 13/102* (2013.01); *G06F 2212/1016* (2013.01)

(58) Field of Classification Search
  CPC ........ G06F 12/0238; G06F 2212/1016; G06F 3/061; G06F 3/0655; G06F 3/0688
  See application file for complete search history.

(56) References Cited

U.S. PATENT DOCUMENTS

| | | | |
|---|---|---|---|
| 7,475,398 B2 | 1/2009 | Nunoe | |
| 7,669,050 B2 | 2/2010 | Blinick et al. | |
| 7,962,926 B2 | 6/2011 | Chen et al. | |
| 8,205,218 B1 | 6/2012 | McCann et al. | |
| 8,380,987 B2 | 2/2013 | Traut et al. | |
| 9,405,682 B2 * | 8/2016 | Meshchaninov | ... G06F 12/0623 |
| 2007/0124365 A1 | 5/2007 | Chen et al. | |

OTHER PUBLICATIONS

Van Meter et al., "Latency Management in Storage Systems", In Proceedings of the 4th Conference on Symposium on Operating System Design & Implementation, vol. 4, Oct. 23, 2000, 15 pages.

Zadok, Erez, "FiST: A System for Stackable File-System Code Generation", In Submitted in Partial Fulfillment of the Requirements for the Degree of Doctor of Philosophy in the Graduate School of Arts and Sciences, May 2001, 141 pages.

"Optimizing Exchange Server in a Tiered Storage Environment", Compellent, In White Paper of Exchange Server, Nov. 2006, pp. 1-10. (author unknown).

* cited by examiner

STORAGE DEVICE ACCESS USING UNPRIVILEGED SOFTWARE CODE

CROSS-REFERENCE TO RELATED APPLICATION

This application is a continuation of, claims the benefit of and priority to, previously filed U.S. patent application Ser. No. 13/531,510 entitled "STORAGE DEVICE ACCESS USING UNPRIVILEGED SOFTWARE CODE" filed on Jun. 23, 2012 and issued as U.S. Pat. No. 9,405,682, the subject matter of which is hereby incorporated herein by reference in its respective entirety.

BACKGROUND

Computer technology consumers utilize various types of storage technologies to retain files that store financial records, documents, photos and other data. The storage systems may move, modify, add or delete data, on behalf of these consumers, as directed by various unprivileged mode software programs (e.g., commonly known as applications). To satisfy consumer demands with respect to latency and efficiency, these storage systems consume a considerable share of available computing resources, including storage space capacities, processing threads, operating system components and/or the like. This share of resources, in addition to reading/writing data, employs various access control mechanisms to synchronize data between threads and maintain consistency amongst variables (e.g., global variables).

A typical storage vendor supplies device-specific software programs that are configured to facilitate the above mentioned control mechanisms as well as perform block-level addressing. These programs run in privileged mode and are commonly known as device drivers. Each device-specific software program, when executed and combined with other privileged mode drivers, collectively function as storage architecture (e.g., a stack of kernel mode drivers and/or compatible storage hardware components). The unprivileged software programs mentioned above utilize this architecture to perform various data storage/retrieval tasks, such as reading/writing data. In the current state of the art, these tasks often result in reduced input/output bandwidth and increased response latency because of the reasons explained below.

Mainly due to overhead caused by some storage architecture components, it is becoming more difficult for current storage devices to handle the increasing loads of input/output requests. These storage architecture components may be unrelated to successfully completing certain data storage/retrieval tasks, but these components are executed anyway, which results in considerable processor overhead. High input/output loads are other example situations that cause a noticeable level of overhead. As another example, executing the data storage/retrieval tasks also can strain a processor already burdened with a considerable number of other tasks. The processor can be further burdened with context switches (e.g., changing program state) when the operating system handles file system operations asynchronously. Because of at least these reasons, the storage architecture described above is limited with respect to input/output efficiency.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards storage architecture configured to input/output various data based in part upon unprivileged code. In one aspect, one or more software programs implementing at least a portion of the storage architecture and running as unprivileged code may facilitate input/output activity between a storage device and another program. The input/output activity may involve storing data in and/or retrieving data from non-volatile memory. Because regions within the non-volatile memory are mapped onto an address space allocated to the other program, the one or more unprivileged software programs may directly or indirectly input/output data to/from the storage device. In one aspect, the provider-based storage architecture differs from existing privileged storage software stacks by minimizing/eliminating privileged software code from being executed during the input/output activity. The provider-based storage architecture may generate an input/output path that bypasses at least a portion of the privileged software code.

In one aspect, the provider-based storage architecture exposes a physical/virtual storage device, or a portion thereof, to a user mode software program/application such that regions of the storage device may be accessed directly from the user mode. In one aspect, the provider-based storage architecture may utilize a minimal amount of privileged software code, including any software program associated with device setup/management. In another aspect, some or all of the privileged software code may be eliminated, such as on an input/output (I/O)-intensive path to reduce response latency.

In one aspect, the provider-based storage architecture may be adapted for different storage device classes, such as processor-inaccessible and processor-accessible storage devices. In one aspect, input/output functionality for new and/or future storage technology may be implemented in one or more vendor-supplied software programs. When the application desires to access stored data in a corresponding storage device, these software programs may be loaded into the provider-based storage architecture.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
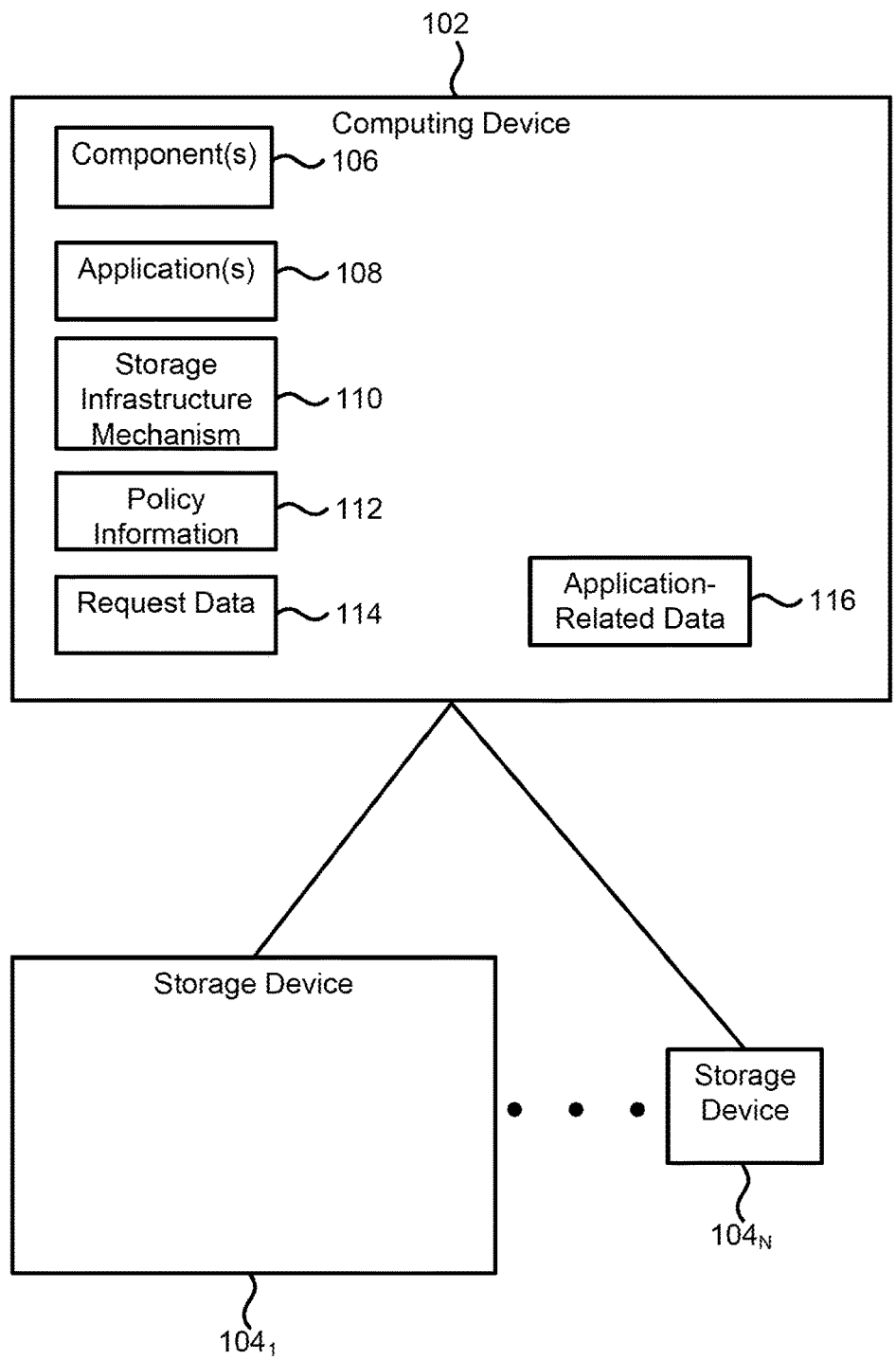
FIG. 1 is a block diagram illustrating an example system for performing input/output activity according to one example implementation.

Various aspects of the technology described herein are generally directed towards establishing access to a storage device via an unprivileged storage architecture component. In one embodiment, a computing device may implement a storage infrastructure mechanism to establish direct access, via a processor, or indirect access, via a memory buffer (e.g., a user mode buffer), to a portion of the storage device. By comparing provider-based storage policy information with request data from the unprivileged storage architecture component, as instructed by other unprivileged code (e.g., a running application), the storage infrastructure mechanism may identify one or more components of the storage architecture to load and execute. One example implementation of the storage infrastructure mechanism may load the unprivileged storage architecture component and/or initiate block-level input/output activity on behalf of the other unprivileged code.

The request data also may define at least one portion (e.g., a region size and offset) of the storage device to allocate for storing application-related data. If the request data satisfies each condition outlined by the policy information, the storage infrastructure mechanism configures at least one path through which the unprivileged storage architecture component and/or the storage device conduct input/output activity. For example, the storage infrastructure mechanism may be configured to map regions of the storage device to corresponding regions of memory within the computing device. In one example implementation, the unprivileged storage architecture component may directly address the mapped storage device regions while remaining in user mode. Hence, each mapping may represent a logical, if not physical, connection or path to one or more storage device regions that enables block-level input/output.

One example storage infrastructure mechanism may include a software program (e.g., commonly known as a driver) running as privileged code in the storage architecture. The storage infrastructure mechanism may examine a discovery request from an application and based upon that request, may verify the application and authorize access to a storage device (e.g., a hardware-accelerated storage device) according to one example embodiment. The discovery request may specify a size (e.g., in bytes) of one or more regions of the storage device to be allocated with respect to the input/output activity on the application-related data. The storage infrastructure mechanism may perform addressing of these regions to substantially match a virtual address space associated with the application-related data, which effectively communicably couples the regions with the unprivileged storage architecture component.

In one example implementation, the unprivileged storage architecture component may generate an interface having an asynchronous and/or a synchronous mode. The synchronous mode may be more appropriate for low-latency, high-throughput devices, for example. On the other hand, because costs related to context switching often become non-trivial, the asynchronous input/output mode may be utilized for large-scale processing jobs to substantially reduce or eliminate such costs.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data storage in general.

FIG. 1 is a block diagram illustrating an example system for various input/output activity according to one example implementation. One or more example components of such a system may include a computing device 102, which may be communicably coupled with a plurality of storage devices 104. It is appreciated that other example implementations may utilize a single storage device instead of the plurality of storage devices 104 (illustrated as a storage device $104_1$ . . . a storage device 104N and hereinafter referred to as the storage devices 104). A device vendor may configure at least one of the example storage devices, such as the storage device $104_1$, to operate with one or more components 106 of an optimized storage architecture.

The computing device 102 may include one or more applications 108 (depicted as "application(s)" in FIG. 1), for example, software programs that run as unprivileged code and desire access to stored data within the storage device $104_1$. An example application 108 may be a user mode, commercially known software program, such as a database application, a high-performance server application, a cloud computing component, a cluster management/security application and/or the like. In response to instructions from the one or more applications 108, a storage infrastructure mechanism 110 may load the storage architecture component(s) 106 and establish access to stored data. On behalf of the one or more applications 108, an example embodiment may facilitate data storage/retrieval with a processor-accessible storage device to which the storage architecture component(s) 106 may read/write data through an appropriate communication channel.

According to one example implementation, the policy information 112 may be used to set up and establish access to the storage device $104_1$. The storage infrastructure mechanism 110 may receive request data 114 from an example user mode program and store one or more parameters (e.g., Global Unique Identifier (GUIDs)) specifying which storage regions (e.g., partitions or raw table data) can be organized and represented as a database volume. For example, the storage infrastructure mechanism 110 may select such a database volume by matching a GUID stored in the request data 114 with one or more registered GUIDs. Furthermore, the storage infrastructure mechanism 110 may compare the GUID for the desired database volume with a security policy to determine whether the database application is authorized to access the database volume. Optionally, the storage infrastructure mechanism 110 may configure the storage architecture components 106 to present a file system structure representing the desired database volume. The storage infrastructure mechanism 110 maps portions of the desired database volume to application-related data 116 in unprivileged (e.g., user mode) address space. These portions may be non-volatile regions within the storage device $104_1$. One of the benefits of mapping one or more regions to the application-related data 116 may include enabling direct access to the desired database volume for an unprivileged component of the storage architecture components 106.

One example embodiment of the application 108 may be a high-performance server application that utilizes the storage architecture component(s) 106 when reading/writing data to a low-level block storage device, instead of an operating system privileged mode driver (e.g., a file system or volume driver) and/or a privileged mode cache (e.g., a kernel data cache), when reading/writing data to a low-level block storage device. To this end, the high-performance server application may be permitted access rights to the low-level block device, via the one or more storage architecture components 106, such that the high-performance server application may more directly manage the input/output activity at a block level (e.g., data sector level) while reducing or eliminating overhead from running privileged (e.g., kernel mode) software programs. In one example implementation, the high performance server application may perform indexing jobs on a data volume. The high performance server application may perform read ahead caching on a sequential storage device (e.g., a magnetic tape library, a flash storage device and/or the like).

Another example implementation comprises a database application that desires access to the storage device $104_1$. The storage infrastructure mechanism 110 may use various policy information 112 (e.g., security policies, access control policies, setup policies, load balancing policies and/or the like) when verifying the database application. After authorizing the database application to access the storage device $104_1$, the database application may prompt the storage infrastructure mechanism 110 to invoke a discovery process during which the storage infrastructure mechanism 110 may enumerate the plurality of storage devices 104, identify one of the storage devices 104 (e.g., the storage device $104_1$) to be a suitable storage device and load a privileged storage architecture component associated with the suitable storage device.

Figure 2:
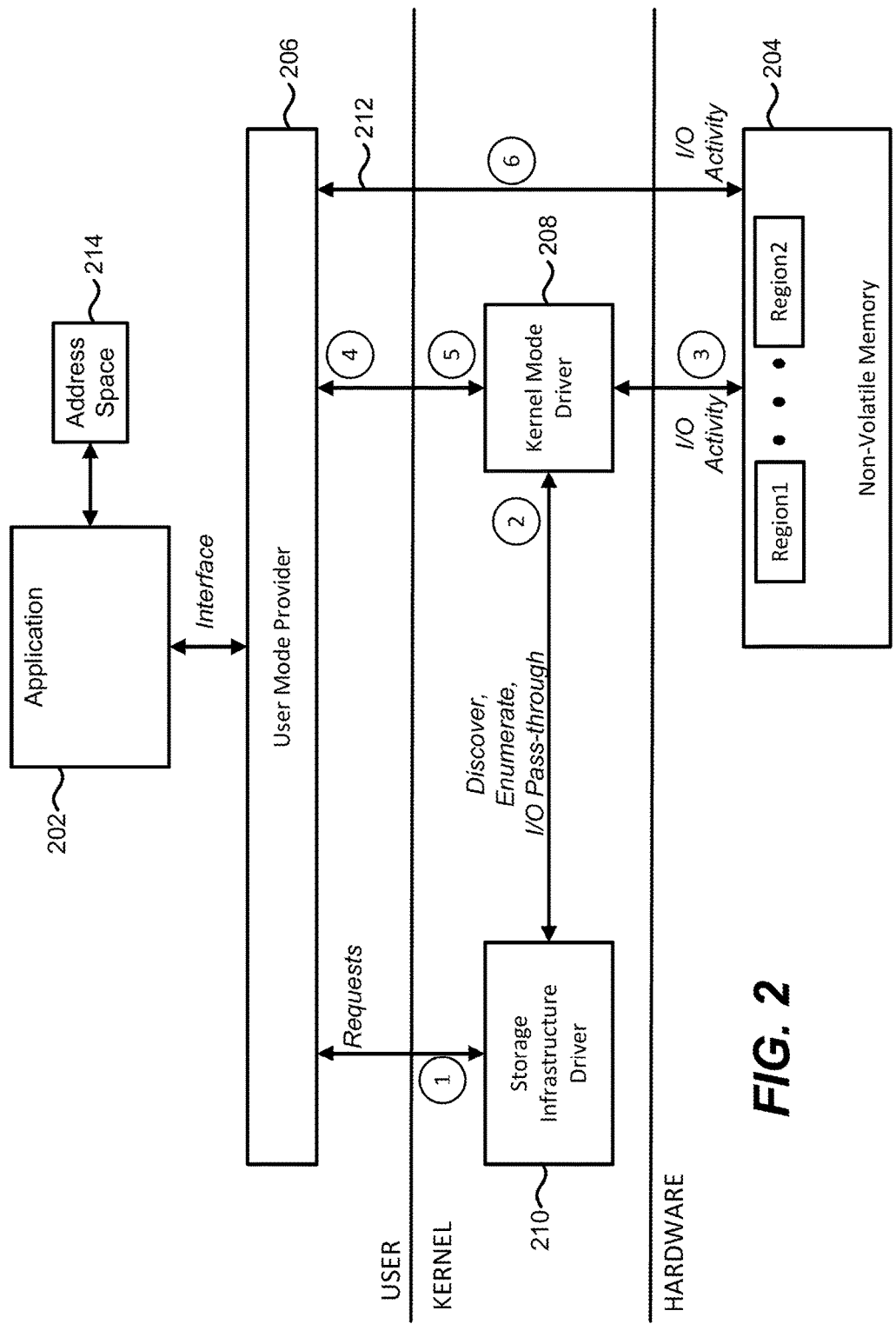
FIG. 2 is a block diagram illustrating an example storage architecture according to one example implementation.

FIG. 2 is a block diagram illustrating an example storage architecture according to one example implementation. The example storage architecture may span different privilege levels/modes, including what is commonly known as a user mode, a kernel mode and a hardware mode, as illustrated in FIG. 2. One or more components of the storage architecture provide an application 202 with access to stored data, in regions of non-volatile memory 204, on which input/output may be performed. The application 202 may directly address such regions if the non-volatile memory 204 is processor-accessible. As an alternative, the application 202 may indirectly access such regions through a user mode buffer in which after input/output activity execution, each modified data block may be written from the user mode buffer to the non-volatile memory 204.

The storage architecture may include a device stack comprising kernel mode software code (e.g., miniport drivers and/or the like) and/or hardware mode software code (e.g., a storage device subsystem). The device stack may provide vendor-supplied functionality configured to operate with other storage architecture components when executing the input/output activity. Example vendor-supplied components of the storage architecture may include a user mode provider 206 (e.g., unprivileged code) and/or a kernel mode driver 208 (e.g., privileged code) for one or more storage device classes/types. Because such components are provided by storage device vendors/manufacturers, the storage architecture may be referred to as a provider-based storage. It is appreciated that the vendors/manufacturers may supply additional components to the storage architecture, or that one or more of the components may come from another source. A storage infrastructure driver 210 may load one or more of the example components to facilitate input/output on an active storage device (e.g., a logical block device), which may comprise at least a portion of the non-volatile memory 204.

The following discussion references example implementations of circled operations labeled (1)-(6) as depicted in FIG. 2. In one example implementation, performing these operations, as ordered by number, may enable direct or indirect access to the non-volatile memory 204 from the user mode provider 206. Some of these operations include input/output (I/O) requests for reading/writing data, input/output (I/O) request completions, acknowledgments and/or the like. Corresponding to the operation labeled (1), when the application 202 desires to perform data storage/retrieval tasks, the storage infrastructure driver 210 receives a request that indicates which storage architecture component to discover/load and how much of the non-volatile memory 204 to allocate for application-related data. According to one example implementation, the storage architecture component may match a desired storage device type. The storage infrastructure driver 210 may respond by enumerating kernel mode software programs (e.g., device drivers) in order to discover the kernel mode driver 208 corresponding to the desired storage device type, as indicated by the operation labeled (2).

In one example implementation, during the operation labeled (2), the storage infrastructure driver 210 may use the kernel mode driver 208 to load the user mode provider 206 if such component is not already loaded. According to the operation labeled (3), the kernel mode driver 208 may initialize the storage device based upon the request data and establish access to one or more regions of the non-volatile memory 204. The storage infrastructure driver 210 may communicate pass-through input/output requests, via the kernel mode driver 208, to the storage device. During the operation labeled (4), the kernel mode driver 208 responds with input/output request completions indicating successful/unsuccessful completion of the pass-through input/output requests. The user mode provider 206 initiates another set of input/output requests through the kernel mode driver 208, corresponding to the operation labeled (5). Alternatively, in hardware-accelerated embodiments, the user mode provider 206 may initiate such input/output (I/O) requests directly via I/O signaling whereby the kernel mode driver 208 is skipped or substantially bypassed.

As described herein, the input/output activity conducted between the storage device and the application 202 may include the communication of block-level and/or file-level input/output requests, for example, file system operations, such as asynchronous and/or synchronous file system operations. For some of these file system operations, the storage device may utilize interrupts (e.g., kernel signals) to denote completion. Instead of handling interrupts with possibly extraneous privileged software code (e.g., kernel mode storage drivers, operating system components and/or the like), which often results in high overhead costs, the provider-based storage architecture may utilize a different completion notification mechanism, such as one based on polling. Polling generally refers to a well-known completion notification mechanism in which the storage device responds to queries from storage architecture components with current file system operation status information, as described herein. The user mode provider 206 thus avoids such overhead costs by minimizing/eliminating the execution of the privileged software code mentioned above. The storage infrastructure driver 210 may be configured to load one or more storage device manufacturer-supplied user mode software programs, which can take advantage of vendor-implemented device features and further enhance input/output activity performance.

To illustrate an example of when the provider-based storage architecture results in cost savings, assume a significant storage I/O load for the user mode provider 206 in which certain functions (e.g., interface functions, file system operations and/or the like) may be invoked frequently. As part of their execution, these functions may query (e.g., poll) the storage device for completions of previously invoked I/O activity, which may cause additional latency when the I/O activity completion rate drops (e.g., below a pre-defined threshold). In such situation, the user mode provider 206 may start using interrupts when a polling timeout expires. If, for example, one or more input/output registers indicate I/O activity completion to the application 202 and the user mode provider 206 fails to signal acknowledgment after a pre-defined timeout (e.g., one or more milliseconds), the storage device may be configured to respond with an interrupt. A device driver may handle the interrupt by instructing the user mode provider 206 to halt current input/output activity. In one example implementation, the user mode provider 206 may modify the timeout to accommodate for a current I/O load. It is appreciated that the example implementations described herein may be adapted for lighter I/O loads.

In one or more embodiments, the user mode provider 206 and/or the kernel mode driver 208 may instantiate appropriate thread synchronization objects, such as I/O completion ports to regions within the non-volatile memory 204, in order to handle the asynchronous file system operations. These objects may be accessible by the device stack and used to indicate a status for each file system operation (e.g., completed, accepted, error, pending and/or the like). If these operations are accepted (e.g., by the kernel mode driver 208 and/or the device stack), the user mode provider 206 and/or the application 202 may commence another set of file system operations until the asynchronous file system operations are completed. Context switching, a computing process for storing and/or restoring system/program state, allows the processor to later resume execution from a same entry point. The device stack responds with completion notifications, which cause the user mode provider 206 to pause/interrupt the other set of file system operations and finish processing the asynchronous file system operations. Example embodiments in which the application 202 may utilize asynchronous input/output may include large processing jobs (e.g., batch jobs), database volume backup, file system indexing, read ahead caching and/or the like. The asynchronous file system operation completions may be reported using conventional operating system components (e.g., overlapped structures, completion ports, interrupts and/or the like) or, alternatively, via a polling mechanism.

The provider-based storage architecture, including the storage infrastructure driver 210, is configured to locate and load unprivileged storage architecture components. As an example, the user-mode provider 206 may be an unprivileged storage architecture component configured to handle file system and/or block-level operations on the regions. After the storage infrastructure driver 210 loads and initializes the user-mode provider 206, the storage infrastructure driver 210 enforces security and/or access policies to ensure that the application 202 has sufficient rights to access/modify the regions without conflicting with other applications.

An example implementation of the provider-based storage architecture establishes access to the non-volatile memory 204 in response to a discovery request communicated by the application 202. Such a request may identify a specific storage architecture component or components for handling the input/output activity initiated by the application 202. The example storage architecture component may be a privileged software program, such as the kernel mode driver 208, corresponding to an unprivileged software program that initiated the discovery request, such as the user mode provider 206.

The discovery request may also define one or more regions to be mapped to the storage architecture component(s)—thereby allowing the application 202 to access stored data (e.g., via a file system). In turn, the storage infrastructure driver 210 issues a request to discover the kernel mode driver 208, loads the user mode provider 206 and then, instructs one or more device drivers to initialize one or more regions. For example, the kernel mode driver 208 may use the device drivers to locate/mount a file system on the requested regions, which may be presented to the user mode provider 206 and/or the application 202. The kernel mode provider 208 may invoke an initial set of input/output activity on the file system prior to being made accessible to the user mode provider 206.

The application 202 may request any combination of access modes, such as read/write access, shared/exclusive access and/or the like. The storage infrastructure driver 210 may multiplex various requests and enforce access policies. Upon satisfying these policies, the storage infrastructure driver 210 allocates one or more regions to the user-mode provider 206. According to one example implementation, the user-mode provider 206 may issue instructions directly to a device driver supplied by the storage device manufacturer vendor. Alternatively, the user-mode provider 206 may issue these instructions directly to the hardware using any suitable data communication method(s). Once the application 202 gains access to the region(s) of interest, the application 202 may access stored data at a block (sector) granularity.

When the application 202 initiates the input/output requests, the user mode provider 206 transfers the input/output requests along a first path to the kernel mode driver 208, as directed by one example implementation. A second path transfers the input/output requests from the kernel mode driver 208 and corresponding regions in the non-volatile memory 204. The device stack may return input/output activity completion notifications to the application 202 along the second path and the first path.

According to alternative implementations, the storage infrastructure driver 210 may establish a direct input/output (I/O) path 212 between the non-volatile memory 204 and the user mode provider 206 instead of using the kernel mode driver 208 to communicate the input/output activity. With little or no privileged software code to execute, the user mode provider 206 may access the non-volatile memory 204 via a processor and perform data read(s)/write(s) without a user-mode data buffer. Hence, the direct input/output path 212 may communicably couple one or more regions of the non-volatile memory 204 with corresponding regions of an address space 214 under the application 202 control.

The address space 214 generally refers to a collection of physical memory regions that may be allocated to one or more unprivileged programs, such as the application 202. According to one example implementation, a portion of local memory, which may be known as a memory buffer or user (mode) buffer, may be addressed to correspond to region locations within the non-volatile memory 204. Such a memory buffer, for example, may include volatile memory and/or non-volatile memory. When the application 202 desires to write data to these region locations, the user mode provider 206 stores the data in the buffer until the stored data is committed to the non-volatile memory 204. The user mode provider 206 may instruct the kernel mode driver 208 to flush the data from the buffer to one or more region locations in the non-volatile memory 204.

In another example implementation of the address space 214, a virtual address space that represents a logical arrangement of disparate physical memory regions in different locations, including a portion of the non-volatile memory 204. When the application 202 desires to modify a data block in the corresponding portions of the address space 214, the user mode provider 206 maintains consistency with the non-volatile memory 204 by automatically writing the data block to a mapped region of the non-volatile memory 204.

The storage infrastructure driver 210 may register a contiguous segment of volatile memory (e.g., Random Access Memory (RAM)) to store the application-related data and perform an address translation for the user mode provider 206 and/or the kernel mode driver 208, rendering the contiguous segment to be byte-addressable, according to one embodiment. The contiguous segment may be assigned to one or more regions within the non-volatile memory 204 such that these regions also are byte-addressable. From the perspective of the user mode provider 206 and/or the application 202, individual random bytes within these regions may be (e.g., indirectly) accessible through the contiguous segment.

The storage infrastructure driver 210 may combine other regions of the non-volatile memory 204 with the contiguous segment and form a virtual memory such that the address space 214 encompasses the other regions and/or the contiguous segment according to one example implementation. Because the user mode provider 206 is configured to perform block-level input/output on a compatible storage device, a data stream of bytes may be transferred between the other regions and the contiguous segment. Optionally, the other regions may be maintained as persistent storage and/or for caching during an unprivileged software program's execution, such as the application 202.

The direct I/O path 212 depicted in FIG. 2 may represent a logical set of software code (e.g., processor-executable instructions) which, when executed, transfers the input/output requests from the application 202 to the storage device. According to one example implementation, the direct I/O path 212 may refer to a local memory location that stores region offset/size information for the non-volatile memory 204. Information indicating completions and/or errors associated with the execution of the input/output requests may be returned to the application 202, via the direct I/O path 212, through a second local memory location.

One possible hardware implementation may assign two or more sets of memory-mapped registers per virtual function. An example first set of configuration registers may store region size and offset information from a beginning of the non-volatile memory 204 (e.g., a first byte in an address space). The size and offset information may be pre-programmed and only accessible by kernel mode software programs, such as the kernel mode driver 208. An example second set of input/output registers may be mapped by the user-mode provider 206 into the address space 214. The second set of input/output registers allows the user-mode provider 206 to initiate the I/O activity and monitor completion of such activity without entering kernel mode. One alternative example implementation may maintain a single virtual function as an alias for a physical function corresponding to an entire storage device, or a substantial portion thereof. When assigned to the application 202, the physical function may provide the application 202 with exclusive access to the entire storage device.

The direct I/O path 212 may be configured to handle a substantial volume of the input/output activity and be referred to as an I/O-intensive path. The provider-based storage architecture improves storage bandwidth along the I/O-intensive path by reducing or eliminating overhead associated with non-provider based storage architectures (e.g., an operating system-based software stack). The storage infrastructure driver 210 may be configured to load one or more device manufacturer-supplied user mode software programs, which may include vendor-implemented device features that facilitate further input/output optimization (e.g., reduction of the I/O-intensive path length).

Using the provider-based storage architecture, the application 202 may create, delete and/or access contiguous portions of the non-volatile memory 204 (e.g., data blocks). According to one example implementation, the user-mode provider 206 may expose an interface through which the application 202 accesses stored data in the non-volatile memory 204 regions and initiates various functions for handling input/output activity. Some of these functions are described further below with respect to FIG. 4. One example implementation may include an optimized hardware interface configured to improve conventional I/O-based storage device performance. In one example implementation, the user mode provider 206 exposes virtual functions for each region of the non-volatile memory 204. Each virtual function, for example, may map to a contiguous portion of the non-volatile memory 204, such as a number of disk sectors or a number of bytes from a starting offset. As a security step, each virtual function may be initialized only in kernel-mode to prevent user-mode programs from accessing unauthorized regions of the non-volatile memory 204.

Figure 3:
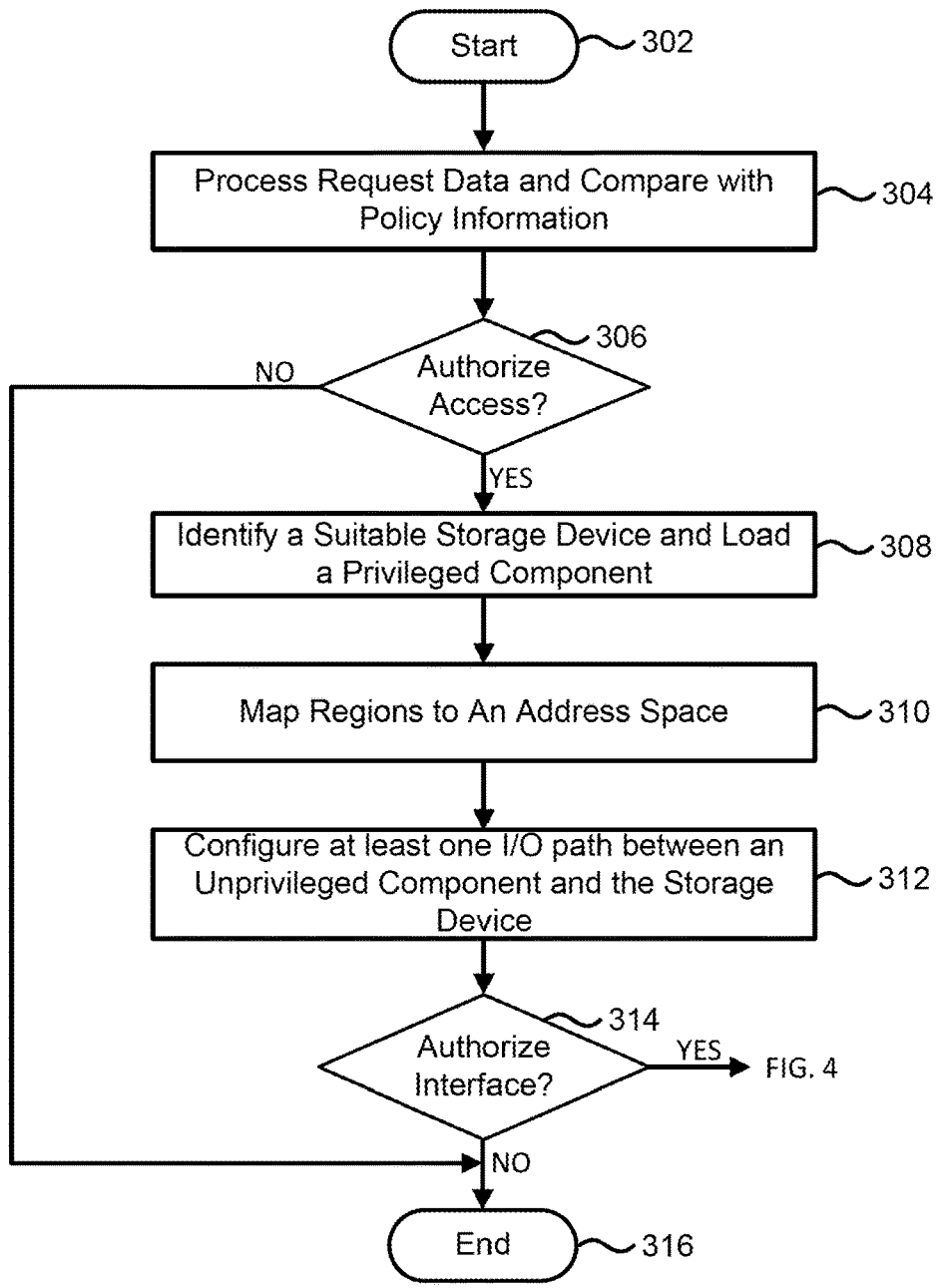
FIG. 3 is a flow diagram illustrating example steps for establishing access to a storage device for an application according to one example implementation.

FIG. 3 is a flow diagram illustrating example steps for establishing access to a storage device using unprivileged code according to one example implementation. One or more of the example steps may be performed by a storage infrastructure mechanism (e.g., the storage infrastructure mechanism 110 of FIG. 1 or the storage infrastructure driver 210 of FIG. 2) within the storage architecture. The example steps commence at step 302 and proceed to step 304 at which the storage infrastructure mechanism processes request data (e.g., the request data 114 of FIG. 1) and compares the request data with policy information (e.g., the policy information 112 of FIG. 1). At step 306, it is determined whether to authorize access to the storage device for the application. Based upon the request data and the policy information, if the application violates one or more policies, step 306 is followed by step 316 where the example steps depicted in FIG. 3 terminate. If the application satisfies the policy information, step 306 is followed by step 308.

Step 308 is directed towards identifying a suitable storage device for reading/writing application-related data. As described herein, the request data also may identify privileged and/or unprivileged storage architecture components for storing the application-related data in the suitable storage device. The storage infrastructure mechanism also may load a privileged storage architecture component for the provider-based storage architecture.

Step 310 represents mapping regions of the storage device to an address space. Prior to such mapping, the storage infrastructure mechanism may partition the storage device and determine which regions may be allocated for unprivileged program use. As described herein, the regions may be directly addressable, via a processor, into a virtual address space associated with the application. In addition to conventional "device read( )/write( )" access semantics, the interface may be configured to handle non-volatile storage devices that may be directly addressable by the processor. The interface, as an example, may manage these storage devices using "memory map( )/unmap( )" access semantics. Because the regions are mapped to an address space and accessible via the processor, the provider-based storage architecture does not allocate the user-mode data buffer to store a temporary copy of the application-related data.

As an example implementation, the unprivileged storage architecture component may perform direct virtual address mapping to a storage/code page or a memory buffer page. Such a change enables automatic mapping of non-volatile memory regions into user-mode, virtual address space, thereby enabling near zero-cost access to the stored data on the non-volatile memory regions. The unprivileged component also may assign a lifetime to each of the mappings. With respect to example implementations involving (e.g., traditional) magnetic storage devices, the unprivileged storage architecture component may continue to allocate a standard memory page for data buffering as part of execution of the "map( )" function.

Step 312 is directed to configuring at least one input/output path between an unprivileged storage architecture component and the storage device. The at least one input/output path may represent a logical connection between user mode address space and regions in the storage device. One example implementation may utilize hardware-accelerated signaling to communicate the input/output activity to the storage device. At Step 314, it is determined whether to authorize generation of an interface through which the input/output activity is communicated to the storage device. In one example implementation where the storage device is directly accessible via a processor, the interface may be appropriate for handling the input/output activity. If the storage infrastructure mechanism decides to authorize generation of the interface, step 314 is followed by the example steps illustrated by FIG. 4. If the storage infrastructure mechanism decides that the interface is inappropriate, step 314 is followed by step 316 where the example steps depicted in FIG. 3 terminate.

Figure 4:
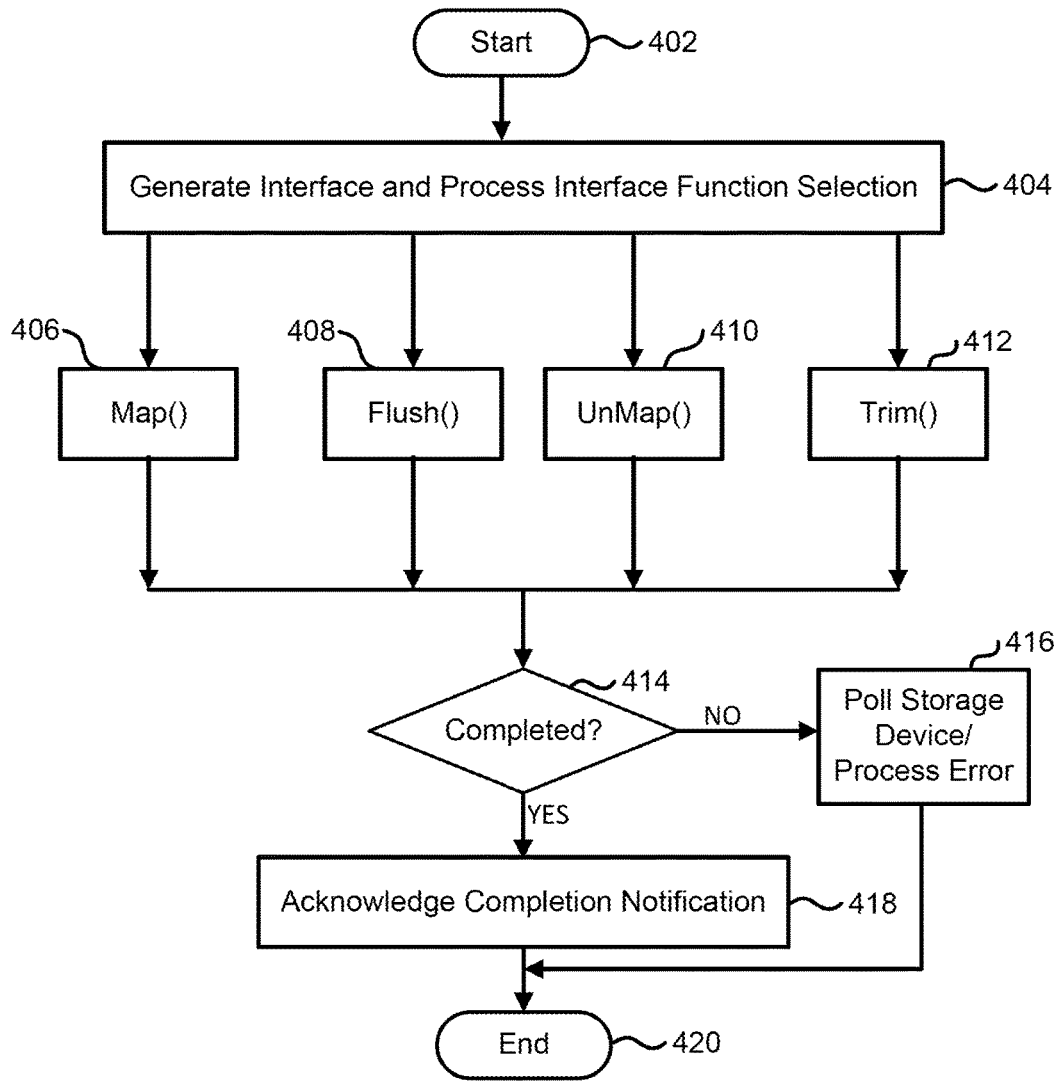
FIG. 4 is a flow diagram illustrating example steps for performing input/output activity on behalf of an application according to one example implementation.

FIG. 4 is a flow diagram illustrating example steps for performing input/output activity on behalf of an application according to one example implementation. One or more of the example steps may be performed by an unprivileged component (e.g., the user mode provider 206 of FIG. 2) and/or a privileged component (e.g., the kernel mode driver 208 of FIG. 2) within provider-based storage architecture. The example steps commence at step 402 and proceed to step 404 at which the unprivileged storage architecture component generates an interface and processes an interface function selection by an application. One example implementation of the interface may be compatible with existing storage devices and/or future storage device classes. With respect to hardware-accelerated storage devices, stored application-related data may be accessible via a processor instead of through a user mode data buffer.

If the interface function selection indicates the "Map( )" function, step 404 is followed by step 406 where the unprivileged storage architecture component maps previously allocated portions of the storage device to the application virtual address space. With respect to storage devices that are not directly addressable via the processor, the provider-based storage architecture may provide unprivileged buffering (e.g., Dynamic Random Access Memory (DRAM) buffering). Valid application-related data, for example, may be transferred from the storage device to virtual address regions in a user mode memory buffer.

If the interface function selection indicates the "Flush( )" function, step 404 is followed by step 408 where the unprivileged storage architecture component initiates write operations of cached data (e.g., in DRAM and/or processor caches) to the storage device. If the interface function selection indicates the "UnMap( )" function, step 404 is followed by step 410 where the unprivileged storage architecture component performs a full write back of cached data (in DRAM and/or processor caches) and unmaps the region from the application virtual address space.

If the interface function selection refers to the "Trim( )" function, step 404 is followed by step 412 where the unprivileged storage architecture component notifies the storage device that a specific portion (e.g., of a storage region) may be deallocated. The unprivileged storage architecture component, for instance, may not need the specific portion for future input/output. As a result, the specific portion is no longer assigned to the unprivileged storage architecture component. Contents of the specified portion may be invalidated and/or re-allocated for storing other data.

At Step 414, it is determined whether the selected interface function has completed. If the storage device finished executing the selected interface function, the storage device may return a completion notification in the form of a signal, such as an interrupt, or another suitable response format, at step 418 of the example steps depicted in FIG. 4. It is appreciated that other mechanisms, including ownership instructions, locks, timers, waits/signals, access control attributes, data streams and/or the like, may be used to notify the storage architecture of a completion. If the storage device did not execute the selected interface function to completion, step 414 is followed by step 416 at which the unprivileged component may receive error indicia associated with the partial execution. If no such error data is received, the unprivileged component may poll the storage device for status information indicating current progress as to the interface function. If no status information is received after a pre-defined timeout, step 416 is followed by step 420.

Step 418 refers to acknowledging the completion notification. For instance, via the interface, the unprivileged component may provide the storage device with data confirming receipt of poll data. In one implementation, if the completion notification remains unacknowledged, the storage device, which may include a kernel mode driver, may override a present completion notification mechanism and communicate an interrupt to pause any current input/output activity. Step 420 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
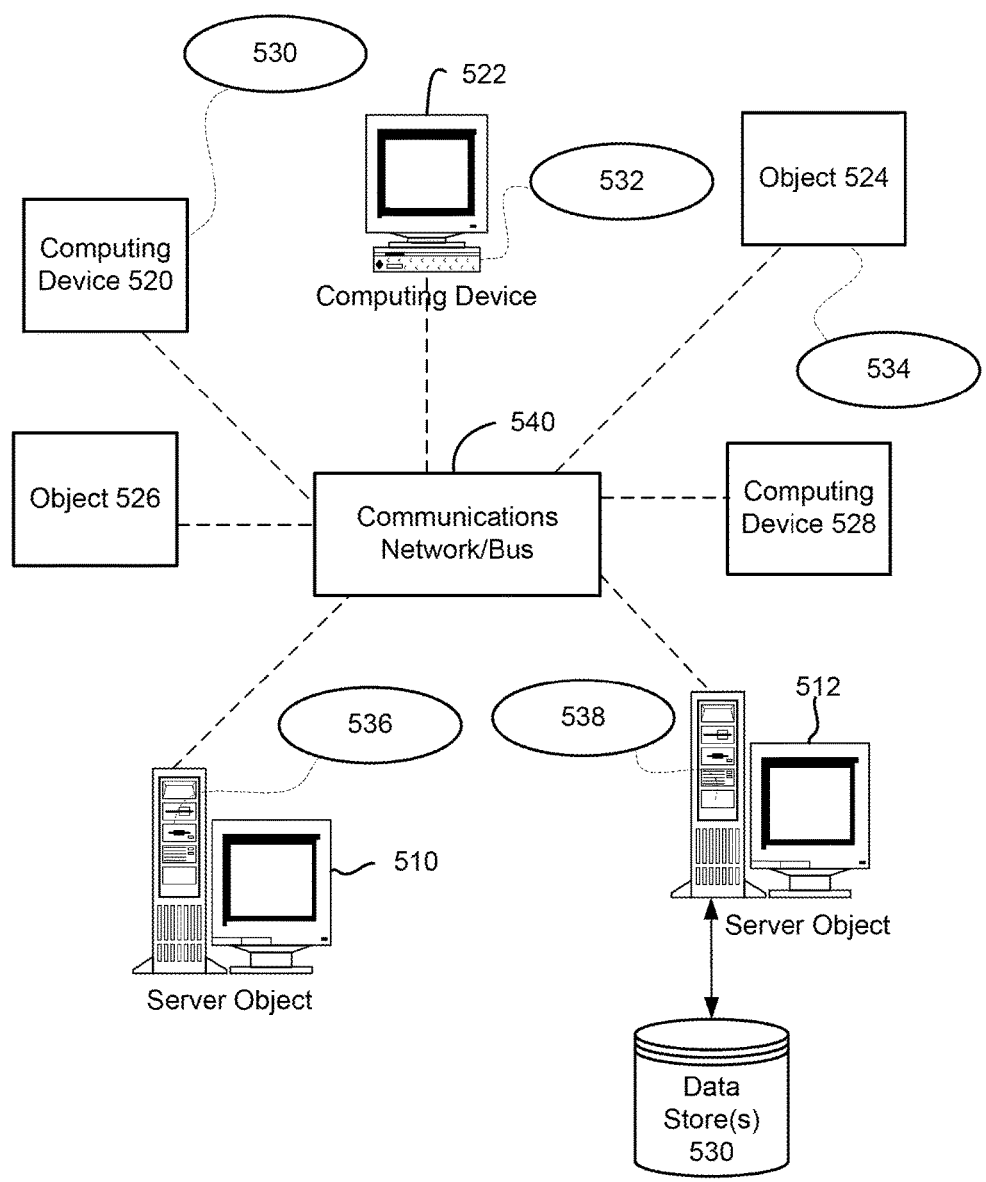
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network/bus 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API (Application Programming Interface), or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting of data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
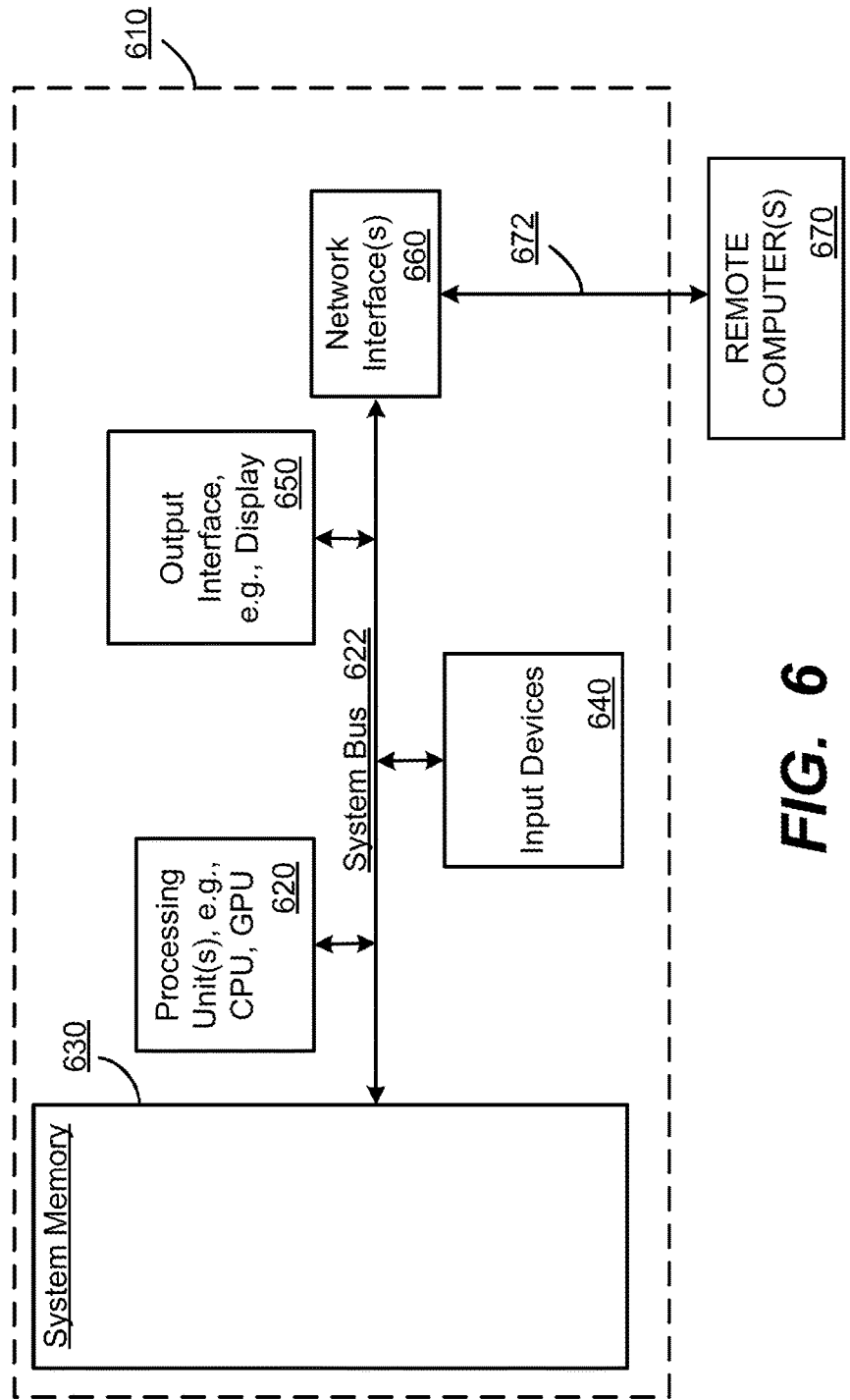
FIG. 6 is a block diagram representing an example non-limiting computing system or operating environment in which one or more aspects of various embodiments described herein can be implemented.

FIG. 6 thus illustrates an example of a suitable computing system environment 600 in which one or more aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, one or more processing unit(s) 620, a system memory 630, and a system bus 622 that couples various system components including the system memory 630 to the one or more processing unit(s) 620.

Computer 610 typically includes a variety of computer readable media which can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer(s) 670. The remote computer(s) 670 may be a personal computer (PC), a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

The invention claimed is:

1. A computing device, comprising:
   at least one processing unit; and
   system memory hardware communicatively coupled to the at least one processing unit and including components comprising:
   a storage infrastructure driver, executing on the at least one processing unit, configured to map at least one portion of non-volatile memory to substantially match a user mode address space associated with application-related data that corresponds to input/output activity, the application-related data being stored in the non-volatile memory and addressable via the at least one processing unit, and to configure at least one path between the at least one portion of the non-volatile memory and an unprivileged component of the components such that the unprivileged component, via the at least one path and the least one processing unit, accesses the application-related data and executes the input/output activity using the address space.

2. The computing device of claim 1, wherein the unprivileged component is configured to maintain consistency between storage regions of the non-volatile memory and corresponding regions of the address space representing user mode application-related data.

3. The computing device of claim 1, wherein the input/output activity comprises at least one of asynchronous file system operations, synchronous file system operations and block-level operations.

4. The computing device of claim 1, wherein the unprivileged component is configured to present an interface through which a user mode application initiates input/output requests and the computing device returns input/output completion notifications.

5. The computing device of claim 1, wherein the unprivileged component is configured to select a completion notification mechanism based on a rate associated with the input/output activity.

6. The computing device of claim 1, wherein the unprivileged component is configured to directly communicate input/output requests to mapped regions of the non-volatile memory based upon corresponding regions of an unprivileged virtual address space.

7. The computing device of claim 6, wherein the unprivileged component is further configured to store user mode application-related data into the regions of the non-volatile memory.

8. The computing device of claim 1, wherein the unprivileged component comprises a user mode provider configured to poll a storage device for completion notifications.

9. The computing device of claim 8, wherein the unprivileged component is further configured to pause the input/output activity in response to an interrupt from a kernel mode driver configured to communicate the interrupt in response to unacknowledged completion notifications.

10. A computing device, comprising:
    at least one processing unit; and
    system memory hardware communicatively coupled to the at least one processing unit and including components comprising:
    a storage infrastructure driver executing on the at least one processing unit and configured to load an unprivileged component of the components, map at least one region of a storage device to substantially match a user-mode address space associated with application-related data that corresponds to input/output activity, and configure at least one path representing at least one logical connection between the user-mode address space and the at least one region of the storage device, wherein the unprivileged component, via the at least one logical connection, accesses the at least one region of the storage device to execute the input/output activity.

11. The computing device of claim 10, wherein the storage infrastructure driver is further configured to map each logical connection to a contiguous portion of non-volatile memory.

12. The computing device of claim 10, wherein the storage infrastructure driver is further configured to receive request data from a user mode program and store one or more parameters specifying which storage regions to organize and represent as a database volume.

13. A computer-implemented method, comprising:
    loading an unprivileged component of a provider-based storage architecture;
    mapping at least one storage region of a memory to substantially match an address space associated with application-related data that corresponds to input/output activity from the unprivileged component; and
    generating a virtual function to operate as an interface between at least one of the at least one storage region of the memory and the unprivileged component, the virtual function to execute a portion of the input/output activity using the address space.

14. The method of claim 13 further comprising mapping each virtual function to a contiguous portion of non-volatile memory.

15. The method of claim 13 further comprising initializing a virtual function in kernel-mode to prevent user-mode programs from accessing unauthorized regions of non-volatile memory.

16. The method of claim 13 further comprising:
    establishing a first path between the unprivileged component and a privileged component associated with the memory;
    establishing a second path between the privileged component and the at least one storage region of the memory; and
    coupling the first path and the second path to form the at least one path for the input/output activity between the at least one storage region of the memory and the unprivileged component.

17. The method of claim 13 further comprising loading a privileged component associated with the memory, the privileged component initiating file system operations on an unprivileged virtual address space representing the at least one storage region of the memory.

18. The method of claim 13 further comprising establishing a path between at least one allocated storage region of the memory and a user mode memory buffer.

19. The method of claim 18 further comprising flushing the user mode memory buffer to the memory.

20. The method of claim 18 wherein the memory comprises a hardware-accelerated storage device, the method further comprising:
    allocating memory regions of the hardware-accelerated storage device for storing user mode application-related data and handling the input/output activity corresponding to the user mode application-related data;

mapping the memory regions to match a virtual address space for the user mode application-related data, the virtual address space representing a logical arrangement of the memory regions in different locations of the hardware-accelerated storage device; and coupling the memory regions with a user mode provider configured to use hardware-accelerated signaling to communicate the input/output activity to the memory regions.

* * * * *